July 5, 1966 H. BOGHOSIAN 3,259,442
ROLL NECK BEARING SEAL
Filed March 25, 1965
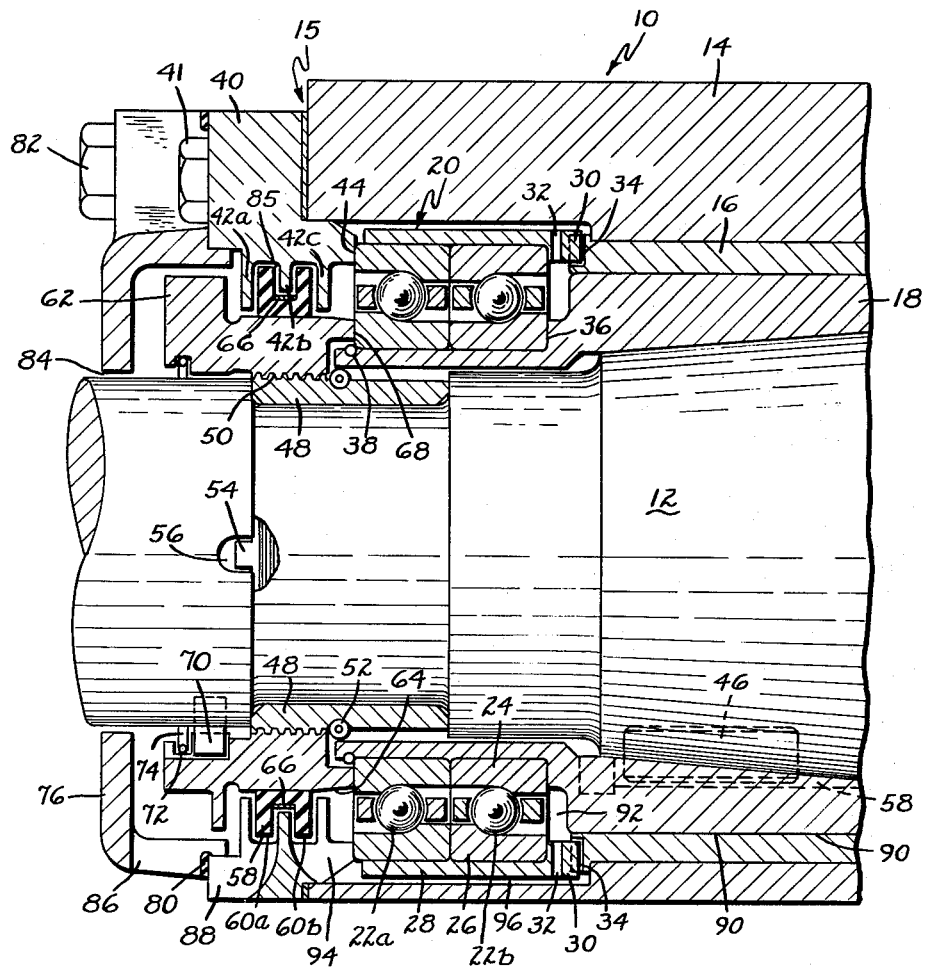
INVENTOR.
*Harry Boghosian*
BY
*Russell, Chittick & Pfund*
Attorneys

United States Patent Office 3,259,442
Patented July 5, 1966

3,259,442
ROLL NECK BEARING SEAL
Harry Boghosian, Worcester, Mass., assignor to Morgan Construction Company, Worcester, Mass., a corporation of Massachusetts
Filed Mar. 25, 1965, Ser. No. 452,952
5 Claims. (Cl. 308—187.1)

This invention, which is a continuation-in-part of copending application Serial No. 306,933, filed September 5, 1963, now abandoned, relates to seals for use in a rolling mill and more particularly to a means of preventing contamination of roll neck bearings by foreign matter such as cooling water, mill scale, dust, etc., while at the same time preventing the loss of lubricating oil from the bearing chocks.

Exclusion of cooling water and other foreign matter from roll neck bearings is of primary importance if excessive bearing wear is to be avoided. This problem, which has yet to be solved to the complete satisfaction of those skilled in the art, is complicated by a combination of several factors. For example, the environment in which mill stands frequently operate is extremely adverse, particularly where high pressure cooling water is copiously applied to the rolls. The cooling water splashes over the rolls and chocks, often resulting in a contamination of the bearings due to the inadequacy of present seal constructions. Moreover, the high speed at which modern mills now operate further complicate the situation by presenting acute frictional problems which practically obviate the possibility of utilizing standard seal constructions. Added to these difficulties is the requirement that a bearing assembly be capable of being readily dismantled when roll changes are required.

Past attempts at providing a satisfactory means of protecting roll neck bearings from contamination have proved only partially successful. To illustrate, the positioning of conventional oil seals between rotating and non-rotating bearing elements was found to be unsatisfactory due to the rapid seal wear caused by friction developed during high speed rotation of the rolls. A more recent attempt at excluding foreign matter from the bearings included the use of inwardly and outwardly extending rigid radial metal flanges on adjacent bearing components in order to create a sealing labyrinth. However, because bearing components are usually axially assembled, a true interlocking relationship between the rigid inwardly and outwardly disposed metal flanges was prevented. This in turn resulted in a failure to provide a true sealing labyrinth capable of satisfactorily excluding cooling water and other foreign matter from the bearing assemblies.

It has now been discovered that by properly combining a flexible inner seal member having outwardly extending resilient radial flanges with an outer rigid flanged seal member, the above-described difficulties can be effectively overcome. Because the inner seal member is flexible, its resilient radial flanges can readily be distorted during axial assembly of the seal components. Once assembled, the resilient flanges on the inner seal member are arranged to cooperate in spaced interlocked relationship with the rigid flanges on the outer seal member, thus providing a true sealing labyrinth without objectionable frictional contact between the sealing members during operation of the mill.

It is therefore an object of the present invention to provide an improved means of excluding cooling water and other contaminative matter from roll neck bearings while at the same time effectively preventing the escape of lubricating oil from within the bearing chock.

Another object of the present invention is to provide a true sealing labyrinth between adjacent rotating and non-rotating bearing elements.

A further object of the present invention is to provide a separate resilient seal of annular construction removably mounted on a rotatable bearing element, said seal being reinforced in order to effectively withstand centrifugal forces developed during operation of the mill.

A still further object of the present invention is to provide a true sealing labyrinth with spaced interlocking flanges between rotating and non-rotating bearing elements, thereby providing a satisfactory means of excluding cooling water and other contaminative materials from the bearing assembly while simultaneously acting to prevent loss of bearing lubricating oil.

These and other objects of the present invention will become more apparent as the description proceeds with the aid of the accompanying drawing in which:

FIG. 1 is a sectional view in elevation taken through a roll neck bearing assembly embodying the concepts of the present invention.

Referring now to FIG. 1, a description of the component parts of a bearing assembly incorporating the present improved sealing arrangement and the procedure to be followed in its assembly will now be described. It should be noted at the outset that preliminary steps in the assembly of the bearing components are completed prior to mounting the entire bearing assembly generally indicated at 10 on the roll neck 12. Moreover, although the description will proceed in connection with the thrust assembly, it should be noted that the present seal construction may also be used on the opposite side of the roll as a part of the float assembly.

The chock 14 is first temporarily placed on an assembly platform in a vertical position with the outboard end generally indicated at 15 upwardly disposed. Bushing 16, which provides the fixed radial bearing surface, is then axially inserted into the chock and locked in non-rotating relationship thereto by a bushing lock screw (not shown) extending through both the chock and the bushing.

The positioning of sleeve 18 having a thrust bearing assembly 20 mounted on its outboard end by a light shrink fit will now be described. As herein shown, thrust bearing assembly 20 is of the ball type having dual sets of ball thrust bearings 22a and 22b encased within inner and outer raceways 24 and 26. Inner raceways 24 are positioned on the outboard end of sleeve 18 by a light shrink fit and as such become the rotating raceways. The outer raceways 26 are contained in a light shrink fit within a cylindrical thrust bearing housing 28 which is provided in order to avoid radial loading of the ball thrust bearings during high speed operation of the mill. Thrust bearing housing 28 is additionally provided with two keys 30 having drain holes 32 adjacent thereto on the inboard side. The keys are designed to engage slots 34 in the bushing as will hereinafter be described. Following the positioning of thrust bearing assembly 20 on sleeve 18 in abutting relationship with collar 36, a snap ring 38 is inserted in a circumferential groove at the outboard end of the sleeve in order to prevent accidental dislocation of the thrust bearing assembly during subsequent axial insertion of sleeve 18 within bushing 16.

The combination of sleeve 18 and thrust bearing assembly 20 is then partially lowered into the vertically disposed chock 14 and thereafter rotated until the keys 30 and 32 on thrust bearing housing 28 are in line with slots 34 at the outboard end of bushing 16. The sleeve 18 is then further lowered into place within the bushing 16 in order to fully engage keys 30 and 32 in slots 34.

A chock end plate 40 is then mounted on the outboard end of chock 14 and held thereon by chock end plate screws indicated typically at 41. As can be seen in the drawing, chock end plate 40 is provided with inwardly disposed integrally fabricated radial flanges collectively designated by the reference numeral 42 and individually identified by the reference numerals 42a, 42b and 42c. In addition, chock end plate 40 is further provided with a thrust bearing engaging shoulder 44 which abuts the outboard outer raceway 26 of thrust bearing assembly 20. This in turn urges thrust bearing housing 28 towards bushing 16, thereby maintaining keys 30 in engagement with slots 34. Thus it can be seen that with this construction, a non-rotating relationship is maintained between the outer raceways 26 of bearing assembly 20 and bushing 16.

It should be noted that up to this point, assembly of the aforementioned components has taken place with the chock 14 in a temporary upright position remotely positioned from the roll. At this stage of assembly, the roll is temporarily supported in a horizontal position on blocks (not shown) with the roll keys 46 usually extending upwardly therefrom. In addition, each roll neck is further provided with two separable half rings 48 contained within a recessed groove to form a collar with circumferentially disposed threads as at 50. Half rings 48 are held together by a half ring spring 52 and are prevented from slipping on the roll neck by keys indicated typically at 54 seated within slots 56.

The assembly of the remaining bearing components including the improved sealing arrangement will now be described. A resilient channel-type seal 58 having an annular configuration with outwardly disposed flexible radial flanges 60a and 60b forming a U-shaped cross-section is then loosely positioned within the chock end plate 40. Seal 58 may be fabricated of any resilient impervious material such as rubber or neoprene. The resilient nature of seal 58 will of course permit temporary distortion in order to place its outwardly disposed radial flanges 60a and 60b in a position straddling the inwardly disposed rigid metal flange 42b of chock end plate 40. At this point, the chock 14 containing the partially assembled bearing assembly is now ready to be lifted by an overhead crane or other means and axially inserted on the roll neck. In so doing, however, care must be taken to insure alignment of a sleeve keyway 59 with the roll neck key 46. With this construction, the roll neck and sleeve 18 will of course rotate within bushing 16. In addition, inner raceways 24 of thrust bearing 20 will also rotate with sleeve 18, the outer raceways 26 remaining fixed between the outboard end of bushing 16 and the thrust bearing engaging shoulder 44 of chock end plate 40. Having thus temporarily positioned seal 58, lock nut 62 is then axially inserted on the roll neck and threaded on the outwardly disposed threads 50 of half rings 48.

It should be noted at this point that seal 58 is provided with an inner diameter slightly smaller than the outer diameter of the lock nut at the point of engagement therebetween. In addition, the outer surface of the lock nut at the inboard end is tapered slightly as at 64 in order to permit initial insertion of the lock nut within the seal with a subsequent expansion of the seal taking place as the lock nut 62 is threaded onto threads 50. Because of this gradual spreading action, a tight fit is insured between the outer surface of the lock nut 62 and the inner diameter of the seal 58. In order to assure constant maintenance of this tight fit regardless of the centrifugal forces exerted on the seal during high speed rotation of the roll neck, a metal reinforcing band 66 may if desired be positioned as a part of seal 58 between the outwardly disposed radial flanges 60a and 60b. Band 66 may be either incorporated as an integral part of seal 58 or in the alternative, may be applied as a separate element. It should be noted, however, that the reinforcing means is not to be restricted to a metal band and can take any conventional form. With this construction, centrifugal forces exerted on the seal during high speed rotation of the roll neck will be opposed by the retaining force of band 66. In this manner, a tight sealing relationship will be maintained between lock nut 62 and seal 58 and in addition, the extremities of flanges 60a and 60b will be prevented from contacting chock end plate 40, thereby preventing frictional seal wear.

Lock nut 62 is tightened until its inboard end engages the outboard inner rotating raceway 24 as at 68. When the nut has been properly tightened, lock nut key 70 is inserted in both a keyway in the roll neck and a half round keyway in the lock nut, with key retainer 72 snap fitted into groove 74 at the outboard end of the nut in order to prevent the lock nut key from being dislodged during the operation of the mill. A dish-shaped end cover 76 is then mounted on chock end plate 40 with a packing ring 80 interposed therebetween in order to insure a tight fit. Cover 76 is held in place on chock end plate 40 by end cover screws indicated typically at 82.

Having thus described the construction and assembly of the roll neck bearing components, the operation of the improved sealing device will now be reviewed. As previously mentioned, during operation of the mill, cooling water is frequently copiously applied to the rolls rotating at high speeds. This of course results in a spray of water in the area of the chocks. The cooling water picks up other contaminative matter such as dirt, scale and grit which if allowed to penetrate into the roll neck bearings, will cause increased bearing wear and frequent intervals of down time.

A large portion of this water will be deflected by the non-rotating end dish-shaped cover 76. However, some of the water will invariably succeed in penetrating between cover 76 and the roll body through the small annular clearance 84. However, further penetration of this water will be effectively prevented by either the outboard end of lock nut 62 or the sealing labyrinth 85 created by the interlocking spaced relationship of rigid chock end plate flanges 42a, 42b and 42c, and the outwardly disposed flexible radial flanges 60a and 60b of seal 58. Therefore, any water which succeeds in penetrating into the interior of end cover 76 will ultimately fall to the bottom of the cover where it will finally flow outwardly through lower passageway 86. Water and other foreign matter deflected by the combined action of the sealing labyrinth will be aided in its outward flow to passageway 86 by inner passageway 88 in the lower portion of chock end plate 40.

It should also be noted that the sealing labyrinth will effectively prevent loss of lubricating oil from the roll neck bearing assembly. More particularly, lubricating oil will flow between sleeve 18 and bushing 16 along line 90 into annular chamber 92. From here the oil will penetrate both sets of ball thrust bearings 22a and 22b and will thereafter be deflected by the sealing labyrinth 85 to flow downwardly through passageway 94 into annular passageway 96 between thrust bearing housing 28 and the inner surface of chock 14. The oil will then recirculate through holes 32.

It is my intention to cover all changes and modifications of the invention herein chosen for purposes of disclosure which do not depart from the spirit and scope of the invention.

I claim:

1. For use in a rolling mill in a roll neck bearing assembly wherein the roll neck is journaled for rotation within an outer stationary chock, said bearing assembly further provided with bearing means interposed between said roll neck and chock, sealing means for avoiding contamination of said bearing means by cooling water and foreign matter comprising the combination of: an outer annular sealing element fixed relative to said chock with rigid radial flanges extending inwardly therefrom, said rigid flanges spaced to provide grooves therebetween; an inner resilient annular sealing element fixed relative to said roll neck for rotation therewith within said chock, said inner sealing element having flexible radial flanges extending outwardly therefrom into the grooves formed between said rigid flanges, said flexible flanges cooperating in spaced relationship with said rigid flanges and said outer sealing element to provide a sealing labyrinth between said inner and outer sealing elements, and reinforcing means on said inner sealing element for maintaining the aforesaid spaced relationship during high speed rotation of said roll neck within said chock.

2. The apparatus as set forth in claim 1 further characterized by said inner sealing element having an inner diameter greater than the outer diameter of said roll neck to provide an annular space therebetween which space facilitates the initial positioning of said inner sealing element on said roll neck, and means for fixing said inner sealing element relative to said roll neck comprising a lock nut threaded on said roll neck to extend through said annular space, said lock nut having a tapered outer surface which frictionally engages and radially expands said inner sealing element.

3. For use in a rolling mill in a roll neck bearing assembly having a neck sleeve slidably mounted on a roll neck for rotation therewith and an annular ball bearing assembly with a rotating inner raceway and a non-rotating outer raceway positioned intermediate the neck sleeve and the roll chock, sealing means for preventing contamination of said bearing assembly by cooling water and other foreign matter comprising the combination of: an annular chock end plate adapted to be mounted on the chock in fixed contact with said outer non-rotating raceway, said chock end plate having a plurality of rigid integrally fabricated radial flanges extending inwardly therefrom towards said roll neck, said rigid flanges spaced to provide grooves therebetween; a lock nut adapted to be threaded on the roll neck for rotation therewith, said lock nut spaced from the inwardly disposed rigid radial flanges of the chock end plate and in fixed contact with said rotating inner raceway; an annular seal mounted on said lock nut for rotation therewith, said seal having flexible flanges extending radially into the grooves formed by the rigid flanges of said chock end plate while maintaining a spaced relationship therebetween in order to provide a sealing labyrinth between said chock end plate and said lock nut.

4. For use in a rolling mill with a roll neck bearing assembly of the type having a fixed outer chock containing a rotatable roll sleeve fixed to a roll neck for rotation therewith and an annular oil-lubricated ball bearing assembly with a non-rotating outer raceway and a rotating inner raceway positioned intermediate the roll sleeve and the chock, sealing means for preventing contamination of said ball bearing assembly by cooling water and other foreign matter comprising: an annular chock end plate adapted to be mounted on the chock in abutting relationship with the outer non-rotating raceway of said ball bearing assembly, said chock end plate having a plurality of rigid integrally fabricated radial flanges extending inwardly therefrom, said rigid flanges spaced to provide grooves therebetween; a lock nut adapted to be threaded in engagement on the roll neck for rotation therewith, said lock nut adapted to be in abutting relationship with the rotating raceway of the ball thrust bearing and spaced radially from the ends of said inwardly disposed flanges on said chock end plate; and a reinforced seal mounted on said lock nut, said seal farbricated of a resilient impervious material and provided with an annular body having a U-shaped cross section with outwardly extending flexible radial flanges, the outwardly disposed flexible radial flanges of said seal extending into the grooves formed by the inwardly disposed radial flanges of said chock end plate to provide a sealing labyrinth between said lock nut and said chock end plate; and reinforcing means for preventing distortion of said seal under centrifugal force developed during rotation of said roll, said reinforcing means comprising a circular metal band surrounding said seal body and positioned between said outwardly extending flexible radial flanges.

5. In a rolling mill, for use in a roll neck bearing assembly of the type having a neck sleeve fixed to the roll neck for rotation therewith within a roll chock with a ball-type bearing having a rotating inner raceway and a non-rotating outer raceway positioned intermediate the neck sleeve and roll chock, a sealing means for preventing contamination of the bearing by cooling water and other foreign matter comprising the combination of: an annular chock end plate adapted to be fixed to the chock in abutting relationship with the outer non-rotating raceway, the chock end plate having a plurality of rigid integrally fabricated flanges extending inwardly therefrom, said rigid flanges being spaced to provide grooves therebetween, the ends of said flanges spaced radially from said neck sleeve; a resilient annular seal member positioned between said neck sleeve and said chock end plate, the inner diameter of said seal member being substantially larger than the outer diameter of said neck sleeve to provide an annular space therebetween, said seal further provided with flexible flanges extending radially into the grooves formed by the rigid flanges extending inwardly from said chock end plate to provide a sealing labyrinth therebetween; and a lock nut adapted to be threaded on the roll neck to extend through said annular space into abutting relationship with the rotating inner raceway of said bearing, said lock nut having a tapered outer surface designed to engage and radially expand said resilient annular seal member in order to provide a tight fit therebetween.

References Cited by the Examiner

UNITED STATES PATENTS

| | | | |
|---|---|---|---|
| 1,916,682 | 7/1933 | Ovestrud | 308—36.4 X |
| 1,925,898 | 9/1933 | Fritz | 279—94 X |
| 2,005,429 | 6/1935 | Licklenstein | 277—53 X |
| 2,071,200 | 2/1937 | Drake | 308—35 |
| 2,161,768 | 6/1939 | Smitmans | 308—36.1 |
| 2,245,281 | 6/1941 | Klopak | 277—67 X |
| 2,362,125 | 10/1944 | Eves | 277—157 |
| 2,983,529 | 5/1961 | Price | 308—187.1 X |

FOREIGN PATENTS

| | | |
|---|---|---|
| 83,178 | 8/1957 | Denmark. |
| 1,057,778 | 3/1954 | France. |

DAVID J. WILLIAMOWSKY, *Primary Examiner.*

DON A. WAITE, *Examiner.*

L. L. JOHNSON, *Assistant Examiner.*